Patented Feb. 23, 1943

2,311,741

UNITED STATES PATENT OFFICE 2,311,741

PRODUCTION OF ALIPHATIC POLY-HYDROXY COMPOUNDS

Henry Dreyfus, London, England, assignor to Celanese Corporation of America, a corporation of Delaware No Drawing. Application October 30, 1940, Serial No. 363,508. In Great Britain November 13, 1939

5 Claims. (Cl. 260—636)

This invention is concerned with the production of aliphatic hydroxy compounds, particularly di- or polyhydroxy compounds, from corresponding halogen compounds by replacement of a halogen atom or atoms by a hydroxyl group or groups. It is especially concerned with the production of glycerol and will be more particularly described with reference to the production of this compound.

According to the present invention glycerol is produced from a corresponding halogen compound (e. g. 1:2:3-trichloro-propane, 1:2-dichlor - 3 - hydroxy-propane, 1:3 - dichlor-2-hydroxy-propane, 1-chlor-2:3-dihydroxy-propane, or 2-chlor-1:3-dihydroxy-propane) by the action of water so as to obtain the glycerol together with free hydrochloric acid. The reaction should therefore be carried out in substantial absence of substances which bind hydrochloric acid, e. g. alkali or alkaline earth metal hydroxides or carbonates.

In carrying out the process of the invention it is preferred to heat the halogen compound together with water or water vapour to a temperature above 100° C., temperatures between 100–180 and especially between 120–170° C. being generally useful while even higher temperatures, e. g. up to 200° C. can be used if desired, although the use of such high temperatures is liable to lead to destruction of part of the halogen compound or glycerol with the production of undesired products. Super-atmospheric pressures of, for instance, 20–40 atmospheres or even higher pressures, e. g. up to 100 atmospheres may be used, and such pressures may be attained by heating the reactants in a closed autoclave and/or by use under pressure of an inert gas, for instance nitrogen.

When using temperatures above 110° C. under normal atmospheric pressure, the boiling point of the azeotropic mixture formed by hydrochloric acid and water, it is possible to remove hydrochloric acid formed in the process continuously with its production. For example, steam at a temperature above 110° C., e. g. at 120–170° C., can be blown through the corresponding halogen compound so as to react with the latter and carry away the hydrochloric acid formed. Again, water or steam at lower temperatures can be introduced into the halogen compound, and heat supplied from an external source to permit hydrochloric acid to escape in vapour form. In general simple treatment of the halogen compound with steam or water under the foregoing conditions will cause removal not only of hydrochloric acid but also of halogen compound undergoing treatment. Such halogen compound may be separated from the escaping vapours by suitable condensing and/or fractionating devices and returned to the reaction zone.

The foregoing process can conveniently be carried out with the aid of a fractionating column or equivalent device. Steam and the halogen compound can be fed into the column at a point removed from either end thereof and maintained at a temperature of above 110° C. but below the boiling point of glycerol. Conveniently the temperature is also below the boiling point of the halogen compound. The requisite temperature can be maintained either by supplying the necessary heat to the steam and/or the halogen compound prior to admission to the column. Again, a heating device may be fitted to the column or the two expedients may be used together.

If desired a vapour mixture of the halogen compound and steam can be made outside the fractionating column and introduced into the latter, if desired after affording opportunity for substantial reaction to take place between the halogen compound and the steam. Under the latter conditions the fractionating column can be regarded mainly as a device for separating the hydrochloric acid from the glycerol.

The temperature of the upper part of the column is adjusted so as to permit the escape of water and hydrochloric acid vapours, while retaining the organic compounds. This temperature regulation can be accomplished by the well-known expedient of condensing and feeding to the top of the column a portion of the escaping vapours.

The lowest portion of the column is advantageously maintained at a temperature above the boiling point of the initial halogen compound (and preferably of any halogen compound formed in the course of the reaction with water) but below that of glycerol. The glycerol produced is removed at the lower end of the column.

The rate of feed of steam to the system should preferably be such that the acid vapours escaping from the top of the column contain a proportion of water at least that of the azeotropic mixture of water with hydrochloric acid.

If desired the reaction may be carried out so that the glycerol produced contains some corresponding halogen compound. Such a product can then be treated by other means, e. g. with aqueous alkalies, so as to convert its content of halogen compound into glycerol. The reaction between the water and halogen compound can be effected at ordinary pressures or at higher or lower pressures. Again, the reaction may be assisted by catalysts favouring the replacement of halogen by hydroxyl by the action of water, e. g. copper compounds. For instance, when operating with a fractionating column as described above a solution of a copper salt may be fed continuously into the column at a point above the zone into which the steam and halogen compounds are introduced. It will ultimately find its way to the lower part of the column and can be separated from the product in any convenient manner.

The water used to react with the halogen compound can be supplied as such (liquid or vapour) or in the form of dilute hydrochloric or other acid of such strength as will not react substantially with the hydroxy compound being produced.

As indicated above the invention is especially concerned with the production of glycerol from a corresponding halogen compound. The new process can, however, be applied for the production of other aliphatic hydroxy compounds, for example for producing a monochlordihydroxypropane from 1:2:3-trichlor-propane or a glycol, e. g. a butylene glycol from the corresponding chlorhydrin or dichlor compound.

Though chlorine compounds only have been specified as examples of suitable starting materials other halogen compounds can be used, e. g. bromine compounds.

The following examples illustrate the invention as applied to the production of glycerol from the alpha chlorhydrin.

*Example 1*

A glass-lined autoclave containing a 10% aqueous solution of glycerol alpha chlorhydrin is charged with nitrogen under a pressure of 25 atmospheres and closed and heated to a temperature of about 135° C. for 5–7 hours.

The autoclave is then allowed to cool and its contents subjected to suitable fractionation, final purification of the glycerol being effected by treatment with caustic soda and re-distillation under a pressure of 10–15 m. m.

*Example 2*

The base of a distillation column is charged with an 81% solution of glycerol and heated to the boiling point of the solution; a temperature of about 150° C. 10% aqueous glycerol monochlorhydrin is introduced into an intermediate portion of the column so that aqueous hydrochloric acid distills off while glycerol formed, together with some hydrochloric acid and unchanged chlorhydrin, collects in the base of the column and is removed continuously or from time to time. Glycerol is recovered from the product thus removed by fractionation under a pressure of 10–15 m. m. and is purified by treatment with caustic soda and re-distillation at 10–15 m. m.

Having described my invention, what I desire to secure by Letters Patent is:

1. Process for the manufacture of an aliphatic poly-hydroxy compound by hydrolysis of a corresponding halogen compound in the substantial absence of substances which bind hydro-halide acids, which comprises effecting the hydrolysis in presence of an excess of water over that theoretically required and at a temperature below the boiling point of the poly-hydroxy compound, and removing from the reaction zone the hydrohalide acid as it is formed as an azeotropic mixture with water and collecting the poly-hydroxy compound in liquid form.

2. Process for the manufacture of an aliphatic poly-hydroxy compound by hydrolysis of a corresponding chlorine compound in the substantial absence of substances which bind hydrochloric acid, which comprises effecting the hydrolysis in presence of an excess of water over that theoretically required and at a temperature below the boiling point of the poly-hydroxy compound, and removing from the reaction zone the hydrochloric acid as it is formed as an azeotropic mixture with water and collecting the poly-hydroxy compound in liquid form.

3. Process for the manufacture of a glycol by hydrolysis of a glycol chlorhydrin in the substantial absence of substances which bind hydrochloric acid, which comprises effecting the hydrolysis in presence of an excess of water over that theoretically required and at a temperature below the boiling point of the glycol, and removing from the reaction zone the hydrochloric acid as it is formed as an azeotropic mixture with water and collecting the glycol in liquid form.

4. Process for the manufacture of glycerol by hydrolysis of glycerol alpha mono-chlorhydrin in the substantial absence of substances which bind hydrochloric acid, which comprises effecting the hydrolysis in presence of an excess of water over that theoretically required and at a temperature below the boiling point of glycerol, and removing from the reaction zone the hydrochloric acid as it is formed as an azeotropic mixture with water and collecting the glycerol in liquid form.

5. Process for the manufacture of glycerol by hydrolysis of glycerol alpha-mono-chlorhydrin in the substantial absence of substances which bind hydrochloric acid, which comprises effecting the hydrolysis in presence of an excess of water over that theoretically required and at a temperature of 120 to 170° C., and removing from the reaction zone the hydrochloric acid as it is formed as an azeotropic mixture with water and collecting the glycerol in liquid form.

HENRY DREYFUS.